United States Patent Office 2,959,519
Patented Nov. 8, 1960

2,959,519
FUNGICIDAL COMPOSITION COMPRISING A 2-HALO-4,6-BIS(AMINO)-S-TRIAZINE

Angelo John Speziale, Kirkwood, and Ernest G. Jaworski, Florissant, Mo., assignors to Monsanto Chemical Company, St. Louis, Mo., a corporation of Delaware No Drawing. Filed Aug. 11, 1958, Ser. No. 754,149

5 Claims. (Cl. 167—33)

This invention relates to new fungicidal compounds for the treatment of plants and especially to the treatment of cereal grain plants such as wheat, oats, rye, barley and the like including such vegetables as beans to avoid certain parasitic plant growths commonly referred to as "rust." More specifically this invention relates to new substituted s-triazines which are particularly effective for inhibiting the growth of fungi known as wheat rust (*Puccinia rubigavera tritici*)

Numerous chemical compounds are known which have biocidal activity such as being active herbicides, nematocides, fungicides, and the like. It is also known that compounds effective for example, as a herbicide may be entirely unsuitable as a fungicide. In fact a number of substituted s-triazines are known which have biocidal activity including 2 - chloro-4-chloro-6-o-chlorophenylamino - s-triazine and 2 - chloro-4,6-bis(ethylamino)-s-triazine, but these compounds were found to be completely unsatisfactory as wheat rust fungicides indicating the criticality of certain substituents being present on the s-triazine nucleus.

Accordingly it is an object of this invention to provide a new group of s-triazine compounds which are active fungicides and which find particular application in the prevention and treatment of diseases of cereal grain plants, caused by pathogenic fungi. Specifically these compounds are active against the parasitic fungus found prevalent on wheat commonly referred to as wheat rust (*Puccinia rubiga-vera tritici*).

According to a further object of this invention there are provided fungicidal compositions containing one or more compounds of the above structure uniformly mixed with one or more of the well known diluents used in formulating fungicidal compositions.

In accordance with this invention it has been discovered that new compounds of the following chemical structure have unusual and valuable fungicidal activity

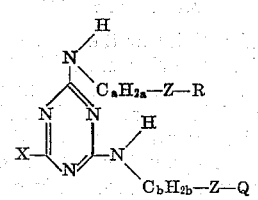

where Z is a member selected from the group consisting of sulfur and oxygen, X is a member selected from the group consisting of chlorine and bromine, $a$ is an integer from 1 to 6, $b$ is an integer from 1 to 6, R is a radical selected from the group consisting of alkyl radicals and alkenyl radicals having up to 8 carbon atoms and the corresponding halogen substituted radicals in which the halogen is selected from the group consisting of chlorine and bromine, Q is a radical selected from the group consisting of alkyl radicals and alkenyl radicals having up to 8 carbon atoms and the corresponding halogen substituted radicals in which the halogen is selected from the group consisting of chlorine and bromine.

Compounds contemplated by this invention include:

2 - bromo - 4,6 - bis(3 - octoxyisohexylamino)-s-triazine
2 - chloro - 4,6 - bis(3 - chloromethoxybutylamino)-s-triazine
2 - bromo - 4,6 - bis(3 - methoxypropylamino)-s-triazine
2 - chloro - 4,6 - bis(3 - ethoxyhexylamino)-s-triazine
2 - bromo - 4,6 - bis(3 - octoxypropylamino)-s-triazine
2 - chloro - 4,6 - bis(3 - methoxyisopentylamino)-s-triazine
2 - chloro - 4,6 - bis(3 - isopropoxypentylamino)-s-triazine
2 - bromo - 4,6 - bis(propoxyhexylamino)-s-triazine
2 - chloro - 4,6 - bis(butoxymethylamino)-s-triazine
2 - chloro - 4,6 - bis(3 - butoxyisopropylamino)-s-triazine
2 - bromo - 4,6 - bis(3 - bromobutoxypropylamino)-s-triazine
2 - chloro - 4 - (3 - methoxybutylamino) - 6 - (3 - ethoxyhexylamino)-s-triazine
2 - bromo - 4 - (3 - bromoethoxypentylamino) - 6 - (2-methoxypropylamino)-s-triazine
2 - chloro - 4 - (3 - isopropoxybutylamino) - 6 - (3-methoxypropylamino)-s-triazine
2 - bromo - 4 - (3 - chlorooctoxypropylamino) - 6 - (3-butoxymethylamino)-s-triazine
2 - bromo - 4,6 - bis(octylthiohexylamino)-s-triazine
2 - chloro - 4,6 - bis(octylthiobutylamino)-s-triazine
2 - chloro - 4,6 - bis(3 - octoxyhexylamino)-s-triazine
2 - chloro - 4,6 - bis(methoxyhexylamino)-s-triazine
2 - chloro - 4,6 - bis(ethoxybromobutylamino)-s-triazine
2 - chloro - 4,6 - bis(chloroallyloxypropylamino) - s-triazine
2 - chloro - 4,6 - bis(chlorobutoxyoctenylamino)-s-triazine
2 - bromo - 4 - (chloromethoxyhexylamino) - 6-(octoxymethylamino)-s-triazine
2 - chloro - 4 - (butoxymethylamino) - 6 - (methoxyhexylamino)-s-triazine
2 - chloro - 4 - (methylthiobutylamino) - 6 - (chlorooctylthiomethylamino)-s-triazine
2 - bromo - 4 - (butylthiomethylamino) - 6 - (methylthiohexylamino)-s-triazine,
and the like.

Although the compounds of this invention in general have utility as fungicides, it has been noted that a narrower group of compounds have been found to be particularly effective against wheat rust fungi. These preferred wheat rust fungicides fall within the group identified by the following structural formula

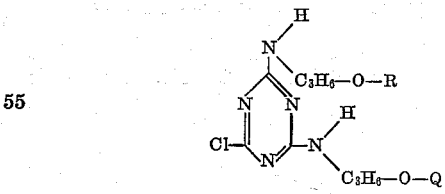

where R is an alkyl group having 1 to 3 carbon atoms and Q is an alkyl group having 1 to 3 carbon atoms.

The 2-halogenated substituted amino-s-triazines are prepared by the reaction of a cyanuric halide, preferably cyanuric chloride or cyanuric bromide with either an alkoxy alkyl amine or an alkylthioalkyl amine. By the appropriate selection of reagents any of the desired new compounds of this invention may be prepared including those in which the amine substituents are unlike. The reaction is preferably conducted in the presence of an acid acceptor such as sodium hydroxide and initiated at temperatures below room temperature so as to control the exothermic reaction which results. In general the reaction temperature is usually maintained at less than 50° C. but this will depend upon the particular amine or amines reacted with the cyanuric halide. It is also customary to include in the reaction mixture a suitable solvent such as acetone. The desired products are usually separated by fractional crystallization since the products have relatively high boiling points.

The invention is further illustrated by the following examples:

EXAMPLE I

*2-chloro-4,6-bis(3-methoxypropylamino)-s-triazine*

To a suspension of cyanuric chloride prepared by adding a hot solution of 18.4 g. (0.1 mole) of cyanuric chloride in 40 ml. of acetone to 60 ml. of water in an ice-bath at 5°–10° C., there is added 18.0 g. (0.2 mole) of 3-methoxypropyl amine at 5°–10° C. during ½ hour. The ice-bath is then removed and 8.0 g. (0.2 mole) of sodium hydroxide (as a 20% solution) is added dropwise during 30 minutes. During the addition of lye the temperature is allowed to rise to 40–45° C. and the rate of lye addition is controlled so as to maintain the reaction mixture slightly alkaline to phenolphthalein. After this period, the mixture is held at 40–45° C. for 15 minutes, cooled to 0°–5° C. and filtered. The filter cake is washed with water and dried. There is obtained 27.0 g. (93% yield) of 2-chloro-4,6-bis(3-methoxypropylamino)-s-triazine, M.P. 162–162.5°. A sample for analysis is recrystallized from absolute ethanol; M.P. 162–162.5° C. Analysis: Calcd. Cl=12.23; found Cl=12.47.

EXAMPLE II

*2-chloro-4,6-bis(3-isopropoxypropylamino)-s-triazine*

This compound is prepared according to the procedure given in Example I from 18.4 g. (0.1 mole) of cyanuric chloride at 23.4 g. (0.2 mole) of 3-isopropoxypropyl amine. The yield of product is 32.4 g. (93%); M.P. 136–137° C. A sample for analysis is recrystallized from absolute alcohol; M.P. 136–137° C. Analysis: Calcd. for Cl=10.25; found Cl=10.35.

EXAMPLE III

*2-chloro-4,6-bis(3-ethoxypropylamino)-s-triazine*

This compound is prepared according to the procedure given in Example I from 18.4 g. (0.1 mole) of cyanuric chloride and 20.6 g. (0.2 mole) of 3-ethoxypropylamine. The yield of product is 30.4 g. (96%); M.P. 147–148°. The sample for analysis is recrystallized from absolute ethanol, M.P. 147–148°. Analysis: Calcd. for Cl=11.15; found Cl=11.36.

EXAMPLE IV

*2-chloro-4,6-bis(3-butoxypropylamino)-s-triazine*

This compound is prepared according to the procedure given in Example I from 36.8 g. (0.2 mole) of cyanuric chloride and 52.4 g. (0.4 mole) of 3-butoxypropylamine. The yield of product is 71.9 g. (96%); M.P. 126–127° C. A sample for analysis is recrystallized from n-hexane or 95% ethanol. Analysis: Calcd. for Cl=9.48; found 9.72.

EXAMPLE V

*2-bromo-4,6-bis(3-methoxypropylamino)-s-triazine*

This compound is prepared by a procedure similar to that given in Example I. An acetone-water suspension of 15.9 g. (0.05 mole) of cyanuric bromide is treated with 9.0 g. (0.1 mole) of 3-methoxypropylamine at 5–10° C. There is then added a 20% solution of sodium hydroxide containing 4 g. (0.1 mole) of sodium hydroxide at 40–45° C. The product, identified as 2-bromo-4,6-bis(3-methoxypropylamino)-s-triazine, is recovered by filtration and washed with water.

EXAMPLE VI

*2-chloro-4,6-bis(octylthiomethylamino)-s-triazine*

To a suspension of 9.2 g. (0.05 mole) of cyanuric chloride, there is added 17.5 g. (0.1 mole) of octylthiomethylamine at 5°–10° C. There is then added 4 g. (0.1 mole) of sodium hydroxide as a 20% solution. During the addition the temperature of the reaction mixture is allowed to warm to 40–45° C. and held at this temperature for 15 minutes after the addition of sodium hydroxide is completed. After cooling to room temperature, the product is recovered by filtration. It is identified as 2-chloro-4,6-bis(octylthiomethylamino)-s-triazine.

EXAMPLE VII

*2-chloro-4,6-bis(6-hexylthiohexylamino)-s-triazine*

This compound is prepared according to the procedure given in Example VI from 9.2 g. (0.05 mole) of cyanuric chloride and 21.7 g. (0.1 mole) of 6-hexylthiohexylamine. The resulting product is identified as 2-chloro-4,6-bis(6-hexylthiohexylamino)-s-triazine.

EXAMPLE VIII

*2-chloro-4,6-bis(allyloxypropylamino)-s-triazine*

Using the procedure of Example VI above, this compound is prepared from 11.5 g. (0.1 mole) of 3-allyloxypropylamine and 9.2 g. (0.05 mole) of cyanuric chloride. The product is identified as 2-chloro-4,6-bis(allyloxypropylamino)-s-triazine.

EXAMPLE IX

*2-chloro-4,6-bis(octenyloxypropylamino)-s-triazine*

This compound is prepared according to the procedure set forth in Example VI above by reacting 9.2 g. (0.05 mole) of cyanuric chloride with 18.6 g. (0.1 mole) of 3-(octenyloxy) propylamine. The resulting product is 2-chloro-4,6-bis(octenyloxypropylamine)-s-triazine.

EXAMPLE X

*2-chloro-4,6-bis(butylthiomethylamino)-s-triazine*

This compound is prepared according to the procedure given in Example VI from 9.2 g. (0.05 mole) of cyanuric chloride and 11.9 g. (0.1 mole) of butylthiomethylamine. The product is identified as 2-chloro-4,6-bis(butylthiomethylamino)-s-triazine.

EXAMPLE XI

*2-chloro-4,6-bis(6-hexoxyhexylamino)-s-triazine*

This compound is prepared according to the procedure given in Example VI by reacting 9.2 g. (0.05 mole) of cyanuric chloride and 20.1 g. (0.1 mole) of 6-hexoxyhexylamine. The product is identified as 2-chloro-4,6-bis(6-hexoxyhexylamino)-s-triazine.

EXAMPLE XII

The fungicidal activity of these new s-triazines is well illustrated by the following experiment made on wheat plants infected with wheat rust. A number of clay pots each containing eight wheat seedlings six-days old were placed in a moist chamber maintained at constant temperature and were sprayed with a fine mist of water. These seedlings were then brought in contact with wheat plants infected with wheat rust by brushing the wheat plants across the tops of the wet foliage of the seedlings. After 48 hours at 70° F. and a relative humidity of 100 percent, the seedlings are removed to greenhouse benches. Four days after inoculation the seedlings are sprayed with various concentrations of each of the new compounds in water, prepared by diluting a one percent solution of the compound in acetone. The table below sets forth results obtained with concentrations of 0.25 percent, 0.10 percent, 0.025 percent, 0.012 percent, and 0.006 percent. Five ml. of solution is applied to the seedlings in each pot which is sufficient to cover the plants to "run-off." A drop of "Tween 20," a polyoxyethylene sorbitan monolaurate, is added to each 5 ml. portion to improve dispersing and wetting. The plants are then returned to greenhouse benches and the incidence of wheat rust disease is noted five days later with the following results:

TABLE I

| Compound | Effectiveness Against Wheat Rust. Percent concentration of compound in water | | | | |
|---|---|---|---|---|---|
| | 0.25 | 0.10 | 0.025 | 0.012 | 0.006 |
| A | E | E | E | E | P |
| B | E | E | P | F | F |
| C | F | F | F | F | F |
| D | F | N | | | |

A. 2-chloro-4,6-bis(3-methoxypropylamino)-s-triazine.
B. 2-chloro-4,6-bis(3-ethoxypropylamino)-s-triazine.
C. 2-chloro-4,6-bis(3-isopropoxypropylamino)-s-triazine.
D. 2-chloro-4,6-bis(3-butoxypropylamino)-s-triazine.

The effectiveness of these compounds against wheat rust or the disease incidence is evaluated on the basis of the number and size of rust pustules in accordance with the following scale:

E—Excellent=No pustules
P—Promising=Very few pustules, small
F—Fair=Intermediate number of pustules, small
N—No good=Many pustules From the above example it will be apparent that the fungicidal compositions of this invention are effective over a wide range of concentrations of the triazine compound including 0.25 percent to as little as 0.006 percent. Although greater concentrations up to and including one percent and even five percent may be used, the preferred range is from 0.25 percent to 0.006 percent. It is also apparent that stable higher concentrations up to 50 percent of the active triazine may also be formulated for purposes of preparing lesser concentrations and to facilitate storage and handling.

The criticality of the structure of compounds having significant activity as plant fungicides is clearly indicated by the fact that compounds differing from those of the present invention and having other substituents on the triazine ring are ineffective as plant fungicides. For example, as shown in the following table, the substitution of radicals such as —OH, —NH($CH_2$)N($C_2H_5$)$_2$, and —NH($CH_2$)$_3OCH_3$, for the halogen substituent results in compounds which are ineffective as plant fungicides. The data in Table II were obtained by the following same procedure as used in obtaining the data set forth in Table I, except for the nature of the compound under test.

TABLE II

| Compound | Effectiveness Against Wheat Rust. Percent concentration of Compound in Water |
|---|---|
| | 0.25 |
| E | N |
| F | N |
| G | N |
| H | N |

E=2-hydroxy-4,6-bis(3-methoxypropylamino)-s-triazine.
F=2-(2-diethylaminoethyl)-4,6-bis(3-methoxypropylamino)-s-triazine.
G=2,4,6-tris-(3-methoxypropylamino)-s-triazine.
H=2-chloro-4,6-bis(2-phenoxyethylamino)-s-triazine.

It is to be noted that the above examples are merely illustrative, and according to this invention fungicidal compositions are contemplated such as dusts, dispersions, and emulsions which comprise one or more of the new compounds of this invention in association with one or more solid or liquid diluents of the types commonly used in fungicidal compositions. In addition these fungicidal compositions may contain one or more materials known to be active as fertilizers, soil conditioners, or plant growth regulators.

Examples of typical fungicidal compositions according to this invention are:

(a) Wettable powders comprising the s-triazine compounds of this invention as the active material dispersed in a concentration up to 50 percent water in an inert absorbent carrier such as a siliceous earth together with a wetting and/or dispersing agent such as an alkali metal salt of a long aliphatic sulphate chain, a partly neutralized sulphuric acid derivative of either a petroleum oil or of natural occurring glycerides, and a condensation product of an alkylene oxide with an organic acid.

(b) Self-emulsifying concentrates comprising the active material in solution in the desired concentration in a suitable organic solvent such as dioxane, acetone, naphtha, and the like plus a suitable wetting agent.

(c) Dusts obtained by dispersing the s-triazines of this invention as the active material in an inert absorbent carrier in combination with one or more inert carriers such as talc, diatomaceous earths, wood flours, and clays.

(d) Compositions of the s-triazines of this invention as the active material formulated in the manner commonly employed in the art for the preparation of fungicidal smokes, dusts, and aerosols.

In addition it is evident that various modifications may be made without departing from the scope of this invention by one skilled in the art with respect to the fungicidal formulations containing these s-triazines and in the method of making the new s-triazines of this invention.

What is claimed is:

1. The process of controlling parasitic fungus growth on plants which comprises applying to the plants a fungicidal composition having as an active ingredient a substituted s-triazine compound of the structure

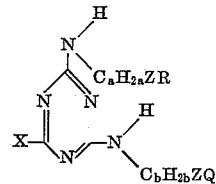

where Z is a member selected from the group consisting of sulfur and oxygen, X is a member selected from the group consisting of chlorine and bromine, $a$ is an integer from 1 to 6, $b$ is an integer from 1 to 6, R is a radical selected from the group consisting of alkyl radicals and alkenyl radicals having up to 8 carbon atoms, and the corresponding halogen substituted radicals in which the halogen is selected from the group consisting of chlorine and bromine, Q is a radical selected from the group consisting of alkyl radicals and alkenyl radicals having up to 8 carbon atoms and the corresponding halogen substituted radicals in which the halogen is selected from the group consisting of chlorine and bromine.

2. The process of controlling wheat rust on wheat plants which comprises applying to the plants a fungicidal amount of 2-chloro-4,6-bis(3-methoxypropylamino)-s-triazine.

3. The process of controlling wheat rust on wheat plants which comprises applying to the plants a fungicidal amount of 2-chloro-4,6-bis(3-ethoxypropylamino)-s-triazine.

4. The process of controlling wheat rust on wheat plants which comprises applying to the plants a fungicidal composition having as an active ingredient 2-chloro-4,6-bis-(3-methoxypropylamino)-s-triazine.

5. The process of controlling wheat rust on wheat plants which comprises applying to the plants a fungicidal composition having as an active ingredient 2-chloro-4,6-bis(3-ethoxypropylamino)-s-triazine.

References Cited in the file of this patent

UNITED STATES PATENTS

| | | |
|---|---|---|
| 2,357,273 | Thurston | Aug. 29, 1944 |
| 2,420,157 | West | May 6, 1947 |
| 2,497,917 | Stauffer | Feb. 21, 1950 |
| 2,720,480 | Wolf | Oct. 11, 1955 |
| 2,763,649 | Albrecht | Sept. 18, 1956 |
| 2,770,622 | Gorton et al. | Nov. 13, 1956 |
| 2,780,623 | Welcher et al. | Feb. 5, 1957 |
| 2,824,823 | Wolf | Feb. 25, 1958 |

FOREIGN PATENTS

| | | |
|---|---|---|
| 1,135,848 | France | Dec. 22, 1956 |

OTHER REFERENCES

Banks et al.: Jour. of the Am. Chem. Soc., vol. 66, 1944, pp. 1772–1774.

Thurston et al.: Jour. of the Am. Chem. Soc., vol. 73, 1951, pp. 2981–2983.

Chem. Abstr., vol. 44, 1950, pp. 9841e and 13083.

UNITED STATES PATENT OFFICE
Certificate of Correction

Patent No. 2,959,519      November 8, 1960

Angelo John Speziale et al.

It is hereby certified that error appears in the above numbered patent requiring correction and that the said Letters Patent should read as corrected below.

Column 1, line 30, for "-o-" read — -o- —; column 2, line 14, for "bis(propoxyhexyl-amino)" read — bis(3-propoxyhexylamino) —; lines 25 and 26, for "-(3-butoxymethyl-amino)-" read — -(butoxymethylamino) —; column 6, lines 40 to 47, the formula should appear as shown below instead of as in the patent:

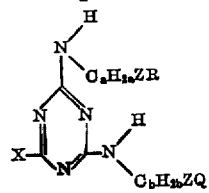

Signed and sealed this 16th day of May 1961.

[SEAL]

Attest:
ERNEST W. SWIDER,
*Attesting Officer.*

DAVID L. LADD,
*Commissioner of Patents.*